United States Patent [19]

Rose et al.

[11] 4,256,579

[45] Mar. 17, 1981

[54] FILTER FOR LIQUIDS

[75] Inventors: Klaus Rose, Mundelsheim; Ulrich Kemmner, Sachsenheim; Peter Ringwald, Rutesheim, all of Fed. Rep. of Germany

[73] Assignee: Robert Bosch GmbH, Stuttgart, Fed. Rep. of Germany

[21] Appl. No.: 92,717

[22] Filed: Nov. 9, 1979

[30] Foreign Application Priority Data

Feb. 16, 1979 [DE] Fed. Rep. of Germany ....... 2905918

[51] Int. Cl.³ ............................................ B01D 35/14
[52] U.S. Cl. ..................................... 210/90; 210/349; 210/439
[58] Field of Search ......................... 210/90, 349, 439

[56] References Cited

U.S. PATENT DOCUMENTS

| | | | |
|---|---|---|---|
| 2,707,051 | 4/1955 | Mailhot et al. | 210/439 X |
| 3,039,485 | 6/1962 | Brohl | 210/349 |

*Primary Examiner*—Frank A. Spear, Jr.
*Attorney, Agent, or Firm*—Michael J. Striker

[57] ABSTRACT

A filter for liquids has a housing, a filtering element accommodated in the housing and having a central tube, and a vibration damper located in the housing and having a membrane, a spring biasing the membrane and a casing arranged to accommodate the membrane and the spring and including a cup-shaped portion which extends into the central tube and receives the spring therein.

14 Claims, 3 Drawing Figures

FILTER FOR LIQUIDS

BACKGROUND OF THE INVENTION

The present invention relates to a filter for liquids.

A great variety of filters for liquids are known in the art. One of such filters is disclosed, for example, in the German Offenlegungsschrift No. 27 25 278.7 and has a vibration damper located between a filtering element and one end of a filter housing. In this vibration damper, a spring-biased membrane is located in a cup-shaped cover part. Such a vibration damper possesses the disadvantage in that the cover part has only a small space for accommodation of the spring, and receives a membrane whose outer diameter is only insignificantly greater than the diameter of the central tube in the filtering element. Despite the fact that in such a construction of the vibration damper the filter for liquids substantially retains its structure, only unsatisfactory damping action of the vibration damper is attained. This is particularly true in the case when the vibration damper must damp the pressure vibrations in the region of several dozens bar which takes place in systems of a fuel pump. A further disadvantage is that this vibration damper is difficult to handle and mount inasmuch as it is composed of several loose parts. In addition, this vibration damper is also difficult to install. Finally, the spring biased membrane of such a damper does not have a support.

SUMMARY OF THE INVENTION

Accordingly, it is an object of the present invention to provide a filter for liquids which avoids the disadvantages of the prior art.

More particularly, it is an object of the present invention to provide a filter for liquids, which allows mounting in a conventional filter a vibration damper which provides for damping action.

In keeping with these objects and with others which will become apparent hereinafter, one feature of the present invention resides, briefly stated, in a filter for liquids which has a vibration damper whose housing has a cup-shaped portion extending into a central tube of a filtering element and accommodating a spring which biases a membrane of the damper. The cup-shaped portion forms a sufficient space for accommodation of a relatively weak spring. Moreover, the damper casing can receive a membrane whose outer diameter considerably exceeds the diameter of the central tube.

In accordance with another advantageous feature of the present invention, a supporting plate is provided which is located at the side of the membrane opposite to the spring and fixedly connected with the damper casing. In such a construction, the vibration damper is a self-contained unit which can be easily adjusted, tested, and handled, separately from the filter. Moreover, such a vibration damper is easy to mount in the filter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
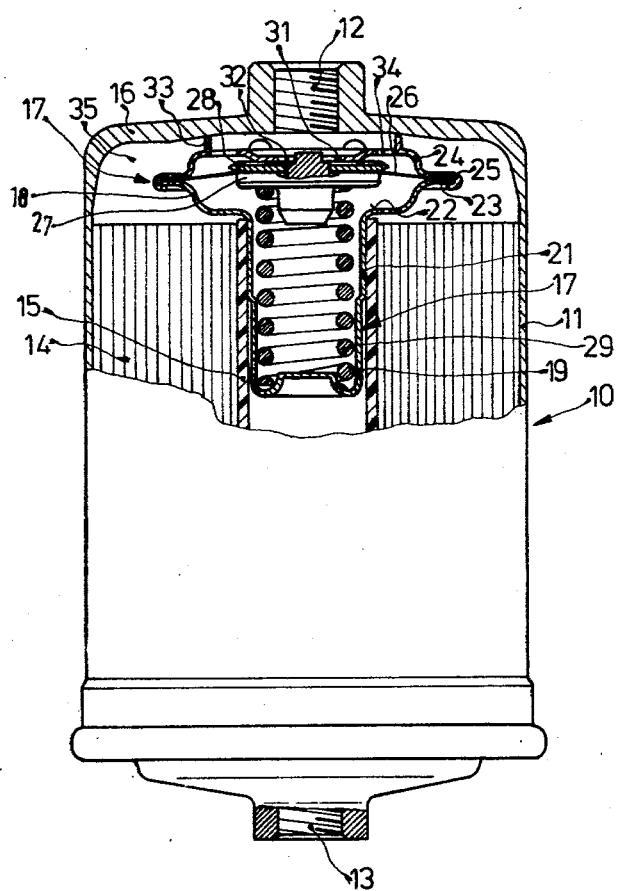
FIG. 1 is a view showing a longitudinal section of a filter for liquids, in accordance with a first embodiment of the present invention.

FIG. 1 shows a filter for liquids in a conduit filter structure, with a housing 1 provided with an inlet opening 12 and an outlet opening 13 which are located opposite to one another.

The housing 11 accommodates a filtering element 14 through which a flow of liquid can pass in an axial direction, and a central tube 15. A vibration damper 17 is arranged in the interior of the housing 1 between the filtering element 14 and a housing end wall 16 in which the inlet opening is formed.

The vibration damper 17 has a damper casing 18 with a cup-shaped portion 19 which extends into the central tube 15. The length of this portion 19 exceeds its outer diameter, and amounts to particularly from 1½ to 2 times of the outer diameter. Further, the portion 19 has an insignificantly wider section 21 which together with the central tube 15 forms sealing between the dirty side and the clean side of the filter. At the end of the section 21, the damper casing 18 has an abutment 22 and an outer edge 23. The diameter of the outer edge 23 exceeds two times the diameter of the cup-shaped portion 19.

A supporting plate 24 is mounted on the damper casing 18. The supporting plate 24 has edges which are so flanged that they simultaneously form a tight and firm clamping place for a membrane 26. A spring plate 27 is mounted centrally on the membrane 26 with the aid of a disc 28. A spring 29 arranged in the cup-shaped portion 19 abuts against a bottom of the latter, on the one hand, and against the spring plate 27, on the other hand.

When no pressure takes place in the inlet opening 12, the disc 28 abuts under the action of the spring 29 against an inwardly bent edge 31 of the supporting plate 24. The edge 31 forms an entrance opening 32 which is located immediately opposite to and coaxial with the inlet opening 12. The supporting plate 24 has outwardly bent ribs 33 which further form several exit openings 34 uniformly distributed over the circumference of the plate. In such a construction, a chamber 35 formed between the membrane 26 and the supporting plate 24 are open outwardly through the above-mentioned openings 32 and 34. The axial location of the vibration damper 17 and thereby of the filtering element 14 in the housing 11 is ensured by the ribs 33 which abut against the end wall 16 of the housing 11.

The above-described filter for liquids 10 operates in the following manner:

When no pressure medium under pressure takes place in the inlet opening 12, the membrane 26 presses under the action of the spring 29 through the disc 28 against the inner edge 31 of the supporting plate 24. Thereby it is guaranteed that in the condition of absence of pressure and thereby also during mounting of the damper 18 in the filter 10, the membrane 26 is not loaded too strong, inasmuch as the force of the spring 29 is absorbed by the supporting plate 24.

In operation, pressure medium having pressure of several bar takes place in the inlet opening 12. The spring 29 located in the air-filled cup-shaped portion 26 is designed with such strength that the membrane 26 under the action of operational pressure is brought into a working position in which it is located in a plane corresponding to the plane of the clamping point. The greater part of pressure medium which enters the inlet opening 12 flows through the entrance opening 32 into the chamber 35 and strikes against the membrane 26. The pressure medium deflected from the membrane 26 flows out of the chamber 35 through the exit openings 34 and travels through the filtering element 14 so as to be cleaned thereby, to the outlet opening 13. Pressure vibrations generated by a fuel pump and acting upon the filter 10 at the pressure side are considerably damped by the spring-biased membrane 26 as well as by deflection of the flow of the pressure medium in the chamber 35. Simultaneously, a small partial flow flows from the inlet opening 12 through an annular gap between the end wall 16 and the supporting plate 24, directly to the filtering element 14, without passing of the chamber 35. This partial flow must not be too great, in order to guarantee sufficient flow through the chamber 35 which is especially advantageous for providing of high damping action.

When the filtering element 14 is dirtied as a result of long operation, the operational pressure in the inlet opening 12 is increased. The membrane 26 presses now stronger against the force of the spring 29 until finally the spring plate 27 abuts against the abutment 22. The abutment 22 prevents overloading of the membrane 26 under the action of pressure shocks in the inlet opening 12. When the vibration damper 17 operates in the region wherein the spring plate 27 continuously abuts against the abutment 22, noise is generated which can be detected by an operator as an acoustic signal indicating the dirtying of the filtering element 14.

Such a vibration damper 17 can be built in the housing 11 without substantially changing the available filter for liquids 10. The wider section 21 of the cup-shaped portion 19, which is located in the central tube 15, performs the functions of the seal between the dirty side and clean side of the filter. The damper 17 allows to damp pressure vibrations in the region of ±0.1 bar about the medium region of the operational pressures of, for example, from 4 to 7 bar. It is especially advantageous when the damper 17 is formed as a self-contained structural part which can be separately handled, operated, and tested. By bending of the inner edge 31 on the supporting plate 24, the damper 17 can be adjusted. The supporting plate 24 at one side and at the other side of the abutment 22 protects the membrane 26 in each case from overloading and thereby from damage.

Figure 2:
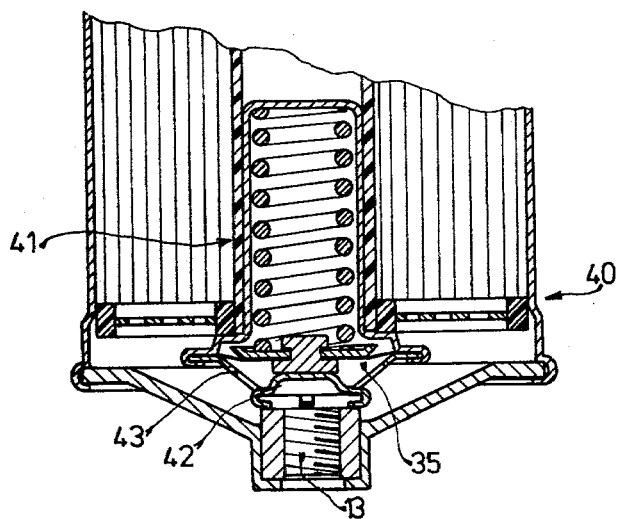
FIGS. 2 and 3 are views showing partial and longitudinal sections of a filter for liquids, in accordance with second and third embodiments of the present invention.

FIG. 2 shows a part of a filter for liquids 40 which somewhat differs from the filter 10 of FIG. 1. Identical reference numerals are utilized in FIG. 2 for identification of the parts identical to those of FIG. 1. The filter 40 has a vibration damper 41 which is located at the filter clean side provided with the outlet opening 13. The damper 41 is constructed substantially as the damper 17 and has an easily exchangeable supporting plate 42. The chamber 35 is connected with the clean side of the filter 40 by openings 43 which are uniformly distributed over the circumference of the supporting plate 42.

The operation of the filter 40 with the damper 41 is substantially similar to that of the filter 10 of FIG. 1; however, the flow through the chamber 35 is not so strong. The arrangement of the damper 41 at the clean side of the filter 40 possesses the advantage in that when the filtering element 14 is dirtied and thereby the operational pressure in the inlet opening increases, the pressure in the outlet opening 13 remains constant because of a pressure regulator connected with the latter. The vibration damper 41 can operate in an optimum manner even in the event of the strongly dirtied filtering element 14.

Figure 3:
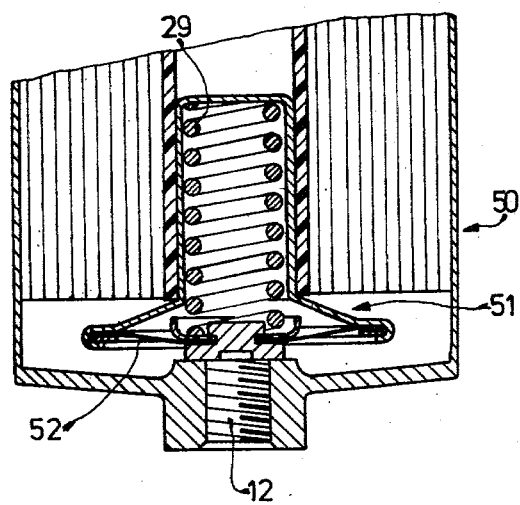

FIG. 3 shows a part of a filter for liquids 50 with a damper 51. The damper 51 differs from the damper 17 of FIG. 1 in that it does not have a supporting plate. Thereby the damper 51 has an especially simple construction. Its membrane 52 must be placed and changed more stable in order to withstand the force of the spring 29. The damper 51, however, is not so easy to handle, test and mount as the damper 17 of FIG. 1.

Other structural modifications are also possible without departing from the subject matter of the present invention. The damper of the filter 10 of FIG. 1 may be arranged not at the dirt side, but at the clean side, if required. The projections 33 on the supporting plate 24 of the damper 17 may be completely omitted, and the supporting plate 24 may be deformed in the region of its openings so that it abuts directly against the end wall 16. Thereby the entire flow of the pressure medium flow from the inlet opening 12 to the filtering element 14 through the chamber 35. This somewhat increases the resistance to flow, but simultaneously provides for especially favorable damping action.

It will be understood that each of the elements described above, or two or more together, may also find a useful application in other types of constructions differing from the types described above.

While the invention has been illustrated and described as embodied in a filter for liquids it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A filter for liquids, comprising a housing having two ends, and an inlet and an outlet spaced from each other and each provided at a respective one of said ends; a filtering element accommodated in said housing and having a central tube; a vibration damper located in said housing in the region between one of said ends of said housing and said filtering element, said vibration damper having a membrane, a spring biasing said membrane, and a casing arranged to accommodate said membrane and said spring and including a cup-shaped portion which extends into said central tube of said filtering element and receives said spring therein.

2. A filter for liquids, as defined in claim 1, wherein said cup-shaped portion has a predetermined diameter and a length which exceeds the diameter of the same.

3. A filter for liquids, as defined in claim 2, wherein the length of said cup-shaped portion from 1.5 to 3 times exceed the diameter of the same.

4. A filter for liquids, as defined in claim 1, wherein said spring is located at one side of said membrane, said damper further having a supporting plate located at the opposite side of said membrane and fixedly connected with said casing.

5. A filter for liquids, as defined in claim 4, wherein said supporting plate is connected with said casing at a connecting point, said supporting plate having, in the region of said connecting point, edges in which said membrane is clamped.

6. A filter for liquids, as defined in claim 4, wherein said supporting plate together with said membrane form a chamber, said supporting plate having a through-going openings which are open into said chamber.

7. A filter for liquids, as defined in claim 6, wherein said openings include a central entrance opening and a plurality of exit openings surrounding said central opening.

8. A filter for liquids, as defined in claim 7, wherein said exit openings are located along a circular line.

9. A filter for liquids, as defined in claim 7, wherein said supporting plate have formations for spacing the same from said housing.

10. A filter for liquids, as defined in claim 4, wherein said said membrane is displaceable, said supporting plate having a deformable portion which forms an adjustable abutment for said membrane.

11. A filter for liquids, as defined in claim 1, wherein said cup-shaped portion of said casing has a predetermined diameter, said membrane having an outer diameter which substantially two times exceeds the diameter of said cup-shaped portion of said casing.

12. A filter for liquids, as defined in claim 1, wherein said filtering element defines a dirt side and a clean side of the filter, said cup-shaped portion of said casing having a radially enlarged section arranged to seal said dirt side and clean side from each other.

13. A filter for liquids, as defined in claim 12, wherein said central tube has an inner surface, said radially enlarged section of said cup-shaped portion of said casing having an outer surface which seal-tightly abuts against said inner surface of said central tube.

14. A filter for liquids, as defined in claim 1, wherein said membrane has a displaceable hub portion, said casing having an abutment portion which forms an abutment for said hub portion.

* * * * *